H. LEWIS.
LUBRICATING OIL STORAGE TANK.
APPLICATION FILED OCT. 8, 1915.
1,246,819.
Patented Nov. 13, 1917.
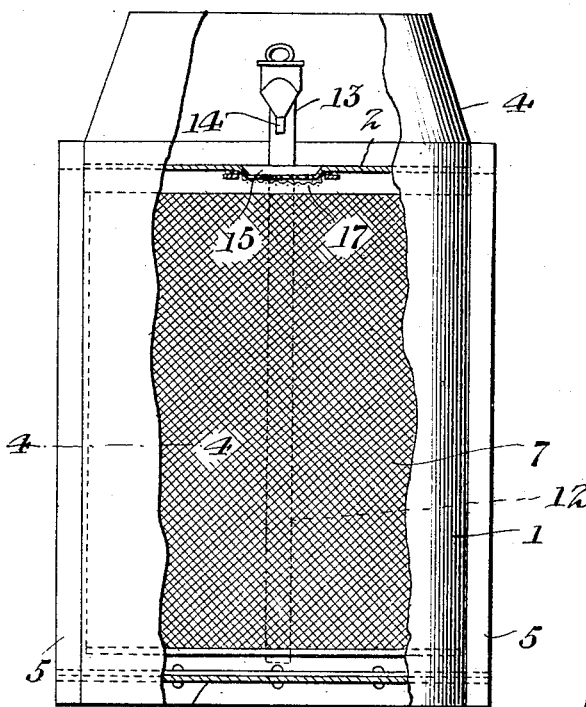
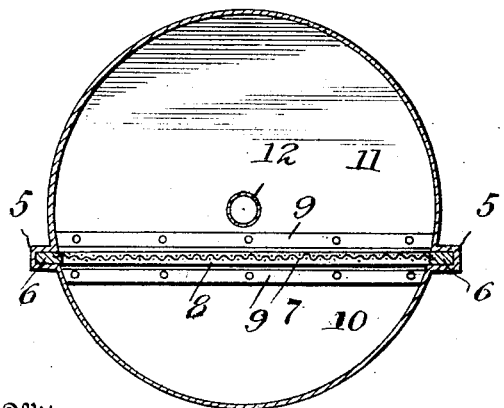
Witnesses
John D. Spalding
D. W. Gould
Inventor
Howard Lewis
By Victor J. Evans
Attorney

UNITED STATES PATENT OFFICE.

HOWARD LEWIS, OF BLOOMINGTON, INDIANA.

LUBRICATING-OIL-STORAGE TANK.

1,246,819.

Specification of Letters Patent.

Patented Nov. 13, 1917.

Application filed October 2, 1915. Serial No. 54,805.

*To all whom it may concern:*

Be it known that I, HOWARD LEWIS, a citizen of the United States, residing at Bloomington, in the county of Monroe and State of Indiana, have invented new and useful Improvements in Lubricating-Oil-Storage Tanks, of which the following is a specification.

The invention relates to an improvement in lubricating oil storage tanks, wherein the tank is divided by a screen partition which will act as a filtering medium for the oil, from one chamber to the other in the tank, so that the oil is effectively cleansed before being pumped from the tank.

The invention in the preferred form of details will be described in the following specification, reference being had particularly to the accompanying drawings, in which:

Figure 1 is a view in elevation showing broken out the improved tank;

Fig. 2 is a horizontal section illustrating the means for supporting the screen at the sides of the tank;

Fig. 3 is a broken vertical section illustrating a means for holding the screen at the bottom of the tank;

Fig. 4 is a horizontal section on the line 4—4 of Fig. 1;

Fig. 5 is an enlarged sectional view illustrating the screened inlet to the tank.

Referring particularly to the accompanying drawings the improved tank is illustrated as a cylindrical member 1 of appropriate height and diameter having a head plate 2 and a bottom 3 above the head plate 2, the tank proper being gradually reduced in diameter as at 4 to house the operative parts.

The vertical wall of the tank is formed at opposite points with U-shaped offsets 5 to slidably receive the side bars 6 of the rectangular frame forming the support for a screen 7 hereinafter more particularly described. The cross bar 8 at the bottom of the frame is held between angle brackets 9 secured to the bottom of the tank. The offsets 5 are formed at one side of the diametric line of the tank so that the tank is divided into a receiving chamber 10 and a pump chamber 11, the latter being preferably somewhat larger than the former. In the pump chamber is arranged a vertical tube 12 leading to a pump 13 of any appropriate type which is supported above the plate 2 and has the outlet nozzle 14 therefrom so located as to discharge fluid in a direct line with the receiving chamber. Plate 2 above the receiving chamber is formed with a depression 15 to receive any type of receptacle to overlie the delivery outlet pump, and the bottom of this depression is formed with perforations 16. A screen 17 overlies the depression being secured beyond the same by a ring 18 fixed in any appropriate manner to the plate. The excess material from the pump, or the material initially through some external source is delivered through openings 16 and screen 17 to the receiving chamber, this being the only point of communication between the space above the plate 2 and the chambers below the same. The screen 7 is a fine mesh copper wire screen so proportioned that the oil is strained or in effect filtered in its delivery from the receiving chamber to the pump chamber. The head plate 2 of the tank is of course removable and following such removal the screen 7 is readily and conveniently lifted from its position in the tank so as to provide an easy means for cleaning, repairs or removing the screen.

What is claimed is:

A tank of the character described comprising top, bottom and side walls, U-shaped outwardly extending guideways formed in said side walls and extending from the top to the bottom thereof, a screen slidably disposed in said guideways and dividing the tank into two compartments, brackets on the bottom of the tank and engaging the sides of said screen, a pump disposed on said top wall and disposed in one compartment and having its discharge nozzle overhanging said top wall above the other compartment, the portion of said top wall below said nozzle being depressed and provided with holes, and a screen disposed below said depression and covering said holes.

In testimony whereof I affix my signature in presence of two witnesses.

HOWARD LEWIS.

Witnesses:
J. E. DARBY,
W. E. HOTTEL.

Copies of this patent may be obtained for five cents each, by addressing the "Commissioner of Patents, Washington, D. C."